Dec. 31, 1935.  L. RICEFIELD  2,025,826
COUPLING
Filed March 21, 1932  2 Sheets-Sheet 1
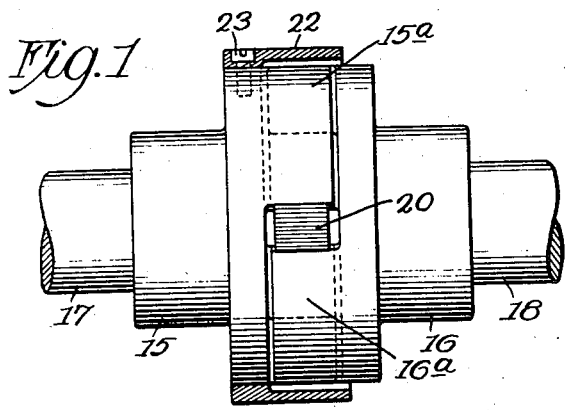
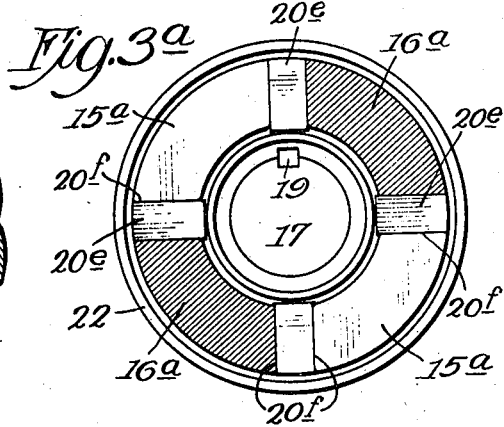
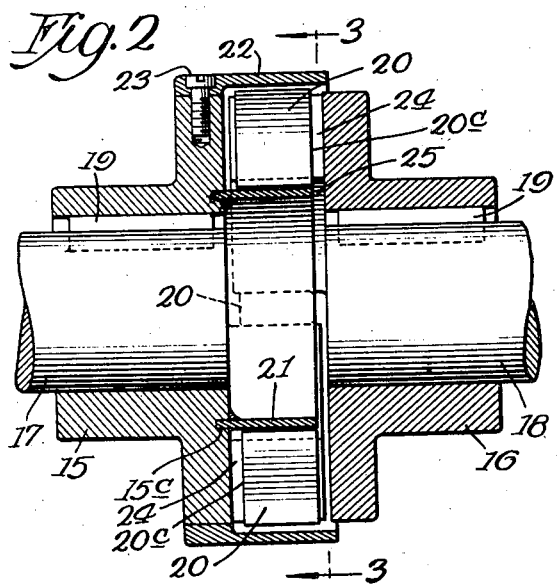
Inventor
Louis Ricefield
By Rector, Hibben, Davis & Macauley
Attys.

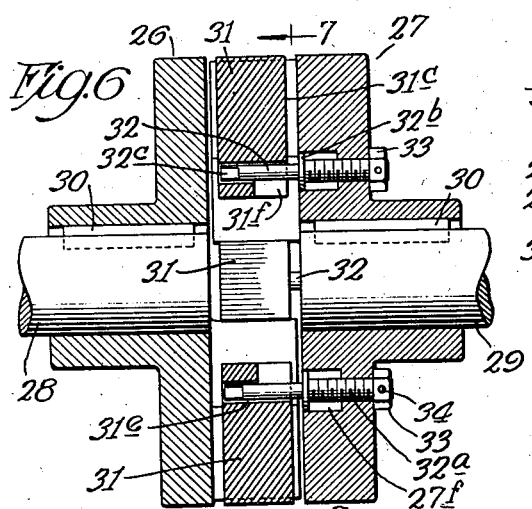

Patented Dec. 31, 1935

2,025,826

UNITED STATES PATENT OFFICE 2,025,826

COUPLING

Louis Ricefield, Oak Park, Ill.

Application March 21, 1932, Serial No. 600,155

8 Claims. (Cl. 64—14)

This invention relates to improvements in couplings and its purpose is to provide a device for connecting substantially aligned shafts in order to compensate for radial displacement, angular misalignment and relative end-play of the shafts during their rotation. The principal object of the present invention is to provide an improved form of coupling comprising a pair of coupling members each adapted to be secured to one of the shafts and each having a plurality of lugs or jaws intermeshing loosely with the lugs or jaws on the other coupling member, with a plurality of power transmitting plugs or blocks, preferably of resilient material, each loosely mounted between two lugs or jaws carried by opposite coupling members, in combination with means for retaining these plugs or blocks in power transmitting positions. Another object of the invention is to provide a coupling for connecting substantially aligned shafts comprising coupling members each adapted to be secured on one of said shafts and having lugs or jaws intermeshing loosely with corresponding lugs or jaws on the other coupling member, in combination with power transmitting plugs or blocks of resilient material each interposed between two lugs or jaws on opposite coupling members, said jaws and power transmitting plugs or blocks having coacting faces which are so shaped that said plugs or blocks will be compressed to the same degree of density at all radial distances from the axes of the shafts so that the plugs or blocks are subjected to the same degree of wear throughout their contacting areas. Still another object of the invention is to provide a coupling comprising a pair of coupling members having parts intermeshing loosely with each other and comprising means for permitting the ready insertion and withdrawal of a plurality of power transmitting members which are adapted to be located between the lugs or jaws carried by opposite coupling members. A further object is to provide an improved coupling comprising a pair of coupling members having jaws intermeshing loosely with each other and power transmitting members each interposed between two jaws of opposite coupling members in combination with improved supporting and retaining means whereby any power transmitting member may be removed and replaced independently of the other power transmitting members. Other objects relate to various features of construction and arrangement which will appear more fully hereinafter.

The nature of the invention will be understood from the following specification taken with the accompanying drawings, in which three embodiments of the invention are illustrated. In the drawings, Fig. 1 shows a side elevation of one form of the improved invention with the outer retaining sleeve or ring illustrated in vertical section;

Fig. 2 shows a vertical section through the structure illustrated in Fig. 1, the section being taken through the axes of the shafts;

Fig. 3 shows a transverse section taken on the line 3—3 of Fig. 2;

Fig. 3a is a transverse sectional view similar to that of Fig. 3, showing the use of power transmitting members having flat lug engaging surfaces;

Fig. 4 shows a side elevation of another form of the invention;

Fig. 5 shows an enlarged radial section taken on the line 5—5 of Fig. 4;

Fig. 6 shows an enlarged radial section through the coupling of Fig. 4 taken through the axes of the connected shafts;

Fig. 7 shows a transverse section taken on the line 7—7 of Fig. 6;

Fig. 8 shows a side elevation of a third form of the invention;

Fig. 9 shows a transverse section taken on the line 9—9 of Fig. 8;

Fig. 10 shows a longitudinal axial section taken through the coupling members illustrated in Fig. 8 and showing the various parts of the coupling spread apart longitudinally of the shafts; and Fig. 11 shows a side elevation of a modified form of retaining ring adapted for use with the form of the invention illustrated in Figs. 8, 9 and 10.

The form of the invention illustrated in Figs. 1, 2 and 3 comprises two similar coupling members 15 and 16 which are adapted to be secured upon the ends of two substantially aligned shafts 17 and 18, respectively, by means of keys 19. Each coupling member 15 comprises a radially extending disk having formed on the end face thereof a plurality of integral lugs or jaws 15a which extend longitudinally of the axis of the shaft 17 and are adapted to intermesh loosely with similar lugs or jaws 16a which are formed on the end face of the disk of the other coupling member 16. Power is transmitted between the lugs or jaws of opposite coupling members by means of a plurality of power transmitting members 20 in the form of plugs or blocks, each of which is located between two jaws carried by opposite coupling members so that when one coupling member is rotated by its shaft, power is transmitted through these members 20 to the jaws of the other coupling member secured upon the other shaft. These power transmitting members 20 are preferably formed of resilient material such as leather or rubber or rubber having layers of fabric embedded therein and, in case they are formed of leather, they are preferably built up of several layers of leather which are glued or otherwise secured together and which are arranged parallel to the surface of the lugs 15$^a$ and 16$^a$ with which they contact.

The power transmitting members 20 are constructed so that their opposite surfaces 20$^b$, which contact with the surfaces 15$^b$ and 16$^b$ of the adjacent lugs or jaws, diverge outwardly from the axis of the coupling, this divergence being preferably along curved lines at a rate which is proportional to the distance from the axis of the shaft. The surfaces 15$^b$ and 16$^b$ of the contacting lugs are similarly curved or divergent so that there is a uniform contact of the surfaces of the power transmitting members with the surfaces of adjacent lugs or jaws and this divergence or curvature of the opposite surfaces is such that when power is transmitted from one coupling member to the other, the compression of each power transmitting member 20 is substantially uniform from its outer edge to its inner edge, as distinguished from the condition which has prevailed in couplings heretofore in use in which members interposed between jaws of opposite coupling members have been subjected to greater compression toward their outer edges than elsewhere with the result that they have worn unevenly and it has been found necessary to discard them while the inner portions thereof were still in good condition. The arrangement of the present invention is adapted to bring about uniform wear of the surfaces of the members 20 throughout the radial extent thereof, thus prolonging the time during which a set of members 20 may be used without replacement. The surfaces 15$^b$ and 16$^b$ are arranged in this instance so that lines drawn on these surfaces at right angles to the radii of the shafts will lie parallel to the axes of the shafts and parallel to a plane midway between opposite faces 15$^b$ and 16$^b$ which contain the axes of the shafts.

The members 20 are mounted loosely between the jaws of opposite coupling members, being restrained against inward movement only by the curvature or divergence of the surfaces with which they contact and it is therefore desirable to provide additional means for retaining them in their proper positions with respect to the jaws of the coupling members. In this embodiment, inward movement of the members 20 is prevented by a sleeve or cylinder 21 which is mounted in a recess 15$^c$ formed in the coupling member 15, where it is secured by brazing, spot welding or the like. This sleeve is concentric with the axis of the shaft 17 and is of such diameter that its outer surface is located in proximity to the inner ends of the members 20 when these members are in their proper positions between the jaws. For the purpose of preventing outward radial movement of the power transmitting members 20, another sleeve or cylinder 22 is secured to the coupling member 15 by means of screws 23 and this sleeve is adapted to extend over the space between the disks of adjacent coupling members in order to confine the members 20. The inner surface of this sleeve 22 may be preferably spaced outwardly to some extent from the outer ends of the members 20 so that the power transmitting members have some freedom of movement in compensating for lateral displacement or angular misalignment of the shafts 17 and 18. The width of the members 20, measured longitudinally of the shafts 17 and 18, is such that when the shafts are in their normal positions with respect to each other, there will be a clearance 24 between the end face of each coupling disk and the adjacent radial end face 20$^c$ of the power transmitting members. There is a similar clearance 25 between the end of the sleeve 21 and the end face of the adjacent coupling member 16. This construction is adapted to permit great freedom of movement in compensating for misalignment and end-play of the shafts and it permits any power transmitting member 20 to be readily removed and replaced when desired. The members 20 might be connected by a hub to form a spider, as described and claimed in my copending application Serial No. 12,226 filed March 21, 1935. The form of the invention illustrated in Fig. 3, which is adapted to bring about uniform wear upon all parts of the contacting surfaces of the members 20 is claimed in my copending application Serial No. 739,419, filed August 11, 1934, which is in part a division of the present application.

In Fig. 3$a$ there is illustrated a construction which is identical with that shown in Figs. 1, 2 and 3, except that the power transmitting members 20$^e$ are of rectangular cross-section and have opposite flat faces 20$^f$ which contact with corresponding flat faces formed on the jaws of the coupling members. These contacting faces of each member 20$^e$ are thus parallel to a plane midway between them and containing the axis of rotation, but they may be inclined longitudinally of the shafts as hereinafter pointed out. The other elements shown in Fig. 3$a$ are the same in construction as shown in Figs. 1, 2 and 3 and have been identified by the same numbers. With either the form shown in Fig. 3, or the form shown in Fig. 3$a$, there is the advantage of having the power transmitting members contact with the adjacent lugs or jaws over relatively large areas so that the wear is minimized and this desirable result is accentuated if the power transmitting members be formed of resilient material so that misalignment and end-play of the shafts are compensated for largely by distortion of the power transmitting members rather than by movement thereof on the jaws.

In Figs. 4, 5, 6 and 7 of the drawings there is illustrated another form of the invention in which different means are employed for retaining the power transmitting members in their proper positions. This form comprises a pair of coupling members 26 and 27 which are secured upon shafts 28 and 29, respectively, by means of keys 30. The coupling member 26 comprises a radially extending disk having a plurality of lugs or jaws 26$^a$ extending therefrom longitudinally of the shaft 28 to intermesh loosely with a plurality of similar jaws 27$^a$ which extend longitudinally from the face of the disk of the other coupling member 27. A plurality of power transmitting members 31 are mounted between the jaws of the opposite coupling members with each member 31 having opposite faces 31$^b$ which are adapted to contact with the faces 26$^b$ and 27$^b$ of the lugs or jaws carried by opposite coupling members. In this instance, the surfaces 31$^b$ of each power transmitting member are parallel to each other and the adjacent faces 26ᵇ and 27ᵇ have a similar parallel relationship but these surfaces may be otherwise formed, if desired. The power transmitting members 31 are preferably formed of resilient material such as rubber, leather or the like, the leather being arranged as before with the laminations directed parallel to the surfaces 26ᵇ and 27ᵇ. The width of the power transmitting members or blocks 31, measured longitudinally of the shafts, is such that when the two shafts and their coupling members are in their proper spaced relationship, there is a clearance between the end faces 31ᶜ of each block and the adjacent end faces of the disks of the coupling members, as shown in Fig. 6. The outer ends of the members 31 are preferably concentric with the outer surfaces of the coupling members 26 and 27 and the inner ends thereof preferably project beyond the inner curved faces 26ᵈ and 27ᵈ of the jaws, as shown particularly in Figs. 5 and 7.

The power transmitting members 31 are retained in their proper positions with respect to the coupling members by means of a series of pins 32 each of which engages an aperture 31ᵉ extending through one of the members 31 in a direction parallel to the axes of the shafts. These pins 32 have enlarged threaded portions 32ᵃ which engage threaded bores 27ᵉ formed in the coupling member 27. These bores through the disk of the coupling member 27 are counterbored as shown at 27ᶠ. The pins 32 have collars 32ᵇ secured thereon at the ends of the threaded portions 32ᵃ and these collars are adapted to enter the counterbored portion 27ᶠ of the coupling disk 27 to limit the extent to which the pins 32 may be withdrawn, as shown in Fig. 5. For the purpose of permitting rotation of these pins 32, their outer ends have nuts 33 secured thereon by cotter pins 34 and they are inserted through the coupling disk from the inner side of the coupling, the inner ends of the pins 32 being flattened on opposite sides as shown at 32ᶜ for engagement by a wrench or the like. In order to permit the insertion of the members 31 between the coupling disks to points where the pins 32 engage the apertures 31ᵉ through the coupling members, the inner walls of these apertures 31ᵉ are preferably notched out as shown at 31ᶠ to receive the projecting ends of the pins 32 when these pins are retracted to their fullest extent, as shown in Fig. 5. The pins 32 thus provide stops which limit the inward movement of the power transmitting members 31 when these members are being assembled in place between the jaws, thus avoiding danger of the members slipping out of the hands of the workman and passing inwardly to the space between the ends of the shafts 28 and 29. When one of the members 31 has been inserted to a point where the projecting end of the adjacent pin 32 engages one end of the aperture 31ᵉ, as shown in Fig. 5, a wrench is applied to the nut 33 and the pin 32 is then rotated until it projects through the aperture 31ᵉ to hold the member 31 in place, as shown in Fig. 6. The bore of the apertures 31ᵉ is preferably somewhat greater than the diameter of the engaging portions of the pins 32 so that the members 31 have sufficient freedom of movement to permit compensation by the coupling for radial displacement, angular misalignment and end-play of the shafts. It will be noted that the apertures 31ᵉ and the supporting pins 32 are located inwardly of the inner curved faces of the jaws 26ᵃ and 27ᵃ, so that they do not interfere with the surfaces of the power transmitting members which contact with the jaws nor tend to affect the strength or resiliency of those portions of the power transmitting members which are subject to compression between the jaws.

In Figs. 8, 9, 10 and 11 of the drawings there is shown a third form of the invention, comprising still another means for holding the power transmitting members in position. This form comprises two similar coupling members 35 and 36 which are secured upon two substantially aligned shafts 37 and 38, respectively, by keys 39. The member 35 comprises a radially extending disk having a plurality of lugs or jaws 35ᵃ extending longitudinally thereof from the shaft 37 to intermesh loosely with similar lugs or jaws 36ᵃ which extend longitudinally of the shaft 38 from the end face of the disk of the other coupling member 36. Power is adapted to be transmitted from the jaws of one coupling member to the jaws of the other coupling member through power transmitting members 40 which, as in the other embodiments, are adapted to be formed of resilient material such as rubber or leather arranged in the manner previously described. Each power transmitting member 40 has a pair of opposite parallel faces 40ᵇ which are adapted to coact with faces 35ᵇ and 36ᵇ formed on the jaws of adjacent coupling members but these faces, although preferably extending parallel to each other, may desirably be arranged so they are not parallel to planes containing the axes of the shafts 37 and 38, but which are inclined thereto as shown in Figs. 8 and 10. This inclination is such that the opposite faces on the same lug or jaw converge toward the disk of the connected coupling member so that, when the parts are assembled, the coaction between the inclined faces of the jaws and the power transmitting members 40 has a component acting longitudinally of the shaft tending to resist relative endwise separation of the shafts 37 and 38.

In order to hold the power transmitting members 40 in position, they are provided with curved apertures 40ᶜ extending through the outer end portions thereof along lines concentric with the axes of the shafts and these holes are engaged by an annular retaining member 41 which occupies grooves 35ᶜ and 36ᶜ formed in the outer faces of the jaws 35ᵃ and 36ᵃ, respectively. In Figs. 8, 9 and 10, the retaining ring 41 is shown as a wire which has its ends reversely bent and interlocked with each other as shown at 41ᵃ. In Fig. 11, there is illustrated a modified form of this retaining ring which is constructed as a helical spring 42 having the ends thereof hooked together as shown at 42ᵃ. This form of retaining ring is adapted to permit greater freedom of movement of the members 40.

The forms of the invention illustrated in Figs. 8, 9, 10, and 11 are claimed in my co-pending application Serial No. 31,881, filed July 17, 1935, except that the longitudinal inclination of the contacting faces of the power transmitting members and the coupling jaws, whereby longitudinal separation of the coupling members is resisted, is claimed in my aforesaid application Serial No. 739,419, filed August 11, 1934.

It will, of course, be apparent that various features embodied in the different forms of the invention herein described may be combined with each other in varying combinations to produce still other forms. For example, power transmitting members having any of the illustrated arrangements of lug engaging surfaces may be combined with any of the described means for retaining these members against radial displacement.

Although three forms of the invention have been shown and described by way of illustration, it will be understood that the invention may be constructed in various other embodiments within the scope of the appended claims.

I claim:

1. The combination in a coupling for connecting substantially aligned shafts, of a pair of coupling members each adapted to be secured to a separate one of said shafts, said coupling members each comprising lugs intermeshing with the lugs of the other coupling member, a plurality of separate power transmitting members each interposed between two adjacent lugs of opposite coupling members, said power transmitting members having apertures therethrough at points removed from their lug-engaging surfaces, and a plurality of pins adjustably engaging one of said coupling members and said apertures for retaining said power transmitting members in lug-engaging positions.

2. The combination in a coupling for connecting substantially aligned shafts, of a pair of coupling members each adapted to be secured to a separate one of said shafts, said coupling members each comprising lugs extending longitudinally of said shafts and intermeshing loosely with the lugs of the other coupling member, a plurality of power transmitting members each interposed between two of said lugs carried by opposite coupling members and each having an aperture therethrough extending longitudinally of said shafts, and pins adjustably engaging one of said coupling members and loosely engaging said apertures.

3. The combination in a coupling for connecting substantially aligned shafts, of a pair of coupling members each adapted to be secured to a separate one of said shafts, said coupling members each comprising lugs extending longitudinally of said shafts and intermeshing loosely with the lugs of the other coupling member, a plurality of power transmitting members each interposed between two of said lugs carried by opposite coupling members and each having an aperture therethrough extending longitudinally of said shafts, pins adjustably engaging one of said coupling members and loosely engaging said apertures, and means for preventing the withdrawal of said pins entirely from the space between said coupling members, said power transmitting members having notches at their inner ends communicating with said apertures to permit the movement of said power transmitting members radially inward between said lugs until the projecting pins engage said members and align with said apertures.

4. The combination in a coupling for connecting substantially aligned shafts, of a pair of coupling members each adapted to be secured to a separate one of said shafts, said coupling members each comprising lugs extending longitudinally of said shafts and intermeshing loosely with the lugs of the other coupling member, a plurality of power transmitting members each interposed between two of said lugs carried by opposite coupling members and each having an aperture therethrough extending longitudinally of said shafts, and pins adjustably engaging one of said coupling members and loosely engaging said apertures, said pins having parts adapted to project and limit the inward movement of said power transmitting members upon assembly of the parts of said coupling.

5. The combination in a coupling for connecting substantially aligned shafts, of a pair of coupling members each adapted to be secured to a separate one of said shafts, said coupling members each comprising lugs extending longitudinally of said shafts and intermeshing loosely with the lugs of the other coupling member, a plurality of power transmitting members each interposed between and contacting with two of said lugs carried by opposite coupling members and each having an aperture therethrough located inwardly of its lug-contacting parts and extending longitudinally of said shafts, and pins extending longitudinally of said shafts and adjustably engaging one of said coupling members and loosely engaging said apertures in said power transmitting members.

6. The combination in a coupling for connecting substantially aligned shafts, of a pair of coupling members each adapted to be secured to a separate one of said shafts, said coupling members each comprising lugs extending longitudinally of said shafts and intermeshing loosely with the lugs of the other coupling member, a plurality of power transmitting members each interposed between and contactiing with two or said lugs carried by opposite coupling members and each having an aperture therethrough located inwardly of its lug-contacting parts and extending longitudinally of said shafts, and pins extending longitudinally of said shafts and adjustably engaging one of said coupling members and loosely engaging said apertures in said power transmitting members, said pins having parts to limit their withdrawal whereby portions thereof always extend beyond the face of said last named coupling member to limit the inward movement of said power transmitting members when said members are inserted between said lugs.

7. The combination in a coupling for connecting substantially aligned shafts, of a pair of coupling members each adapted to be secured to a separate one of said shafts, said coupling members each comprising lugs extending longitudinally of said shafts and intermeshing loosely with the lugs of the other coupling member, a plurality of power transmitting members each interposed between and contacting with two of said lugs carried by opposite coupling members and each having an aperture therethrough located inwardly of its lug-contacting parts and extending longitudinally of said shafts, and pins extending longitudinally of said shafts and adjustably engaging one of said coupling members and loosely engaging said apertures in said power transmitting members, said pins having parts to limit their withdrawal whereby portions thereof always extend beyond the face of said last named coupling member to limit the inward movement of said power transmitting members when said members are inserted between said lugs, said power transmitting members having notches at their inner ends communicating with said apertures to permit the movement of said lugs over said pins until said pins align with said apertures.

8. The combination in a coupling for connecting substantially aligned shafts, of a pair of coupling members each adapted to be secured to a separate one of said shafts, said coupling members each comprising lugs intermeshing with the lugs of the other coupling members, a plurality of separate power transmitting members each interposed and adapted to be compressed between two adjacent lugs carried by opposite coupling members, said power transmitting members having apertures therein at points outside of their compression areas, and a plurality of pins carried by one of said coupling members and engaging said apertures for retaining said power transmitting members in lug-engaging positions.

LOUIS RICEFIELD.